United States Patent [19]

Sorlie et al.

[11] 4,023,510
[45] May 17, 1977

[54] DEPTH CONTROL AND PROTECTIVE APPARATUS FOR TILLAGE ASSEMBLY

[75] Inventors: Donald Thomas Sorlie, Ankeny; Henry William Brandt, Jr., Des Moines; Thomas E. Hitzhusen, Huxley, all of Iowa

[73] Assignee: Deere & Company, Moline, Ill.

[22] Filed: Jan. 15, 1976

[21] Appl. No.: 649,333

[52] U.S. Cl. .................... 111/85; 172/68; 172/71; 172/555; 172/657
[51] Int. Cl.² .......................................... F23B 1/00
[58] Field of Search ............. 111/1, 14, 17, 22, 52, 111/60, 61, 62, 63, 66, 69, 85, 86, 87, 88, 80; 37/80, 87, 91, 92, 93, 94, 95, 96, 97, 142.5, 189, 190, 191 A; 172/19, 55, 75, 78, 60, 90, 47, 103, 120, 117, 188, 387, 392, 393, 398, 518, 519, 538, 550, 536, 557, 548, 574, 556, 582, 668, 669, 681, 697, 727, 744, 764, 547, 68, 71, 555, 657

[56] References Cited

UNITED STATES PATENTS

| | | | |
|---|---|---|---|
| 1,005,544 | 10/1911 | Henderson | 37/189 |
| 1,254,266 | 1/1918 | Patric | 111/80 |
| 1,286,044 | 11/1918 | McNeal | 111/87 |
| 2,332,012 | 10/1943 | Rasmussen | 111/88 |
| 2,690,145 | 9/1954 | Romain | 172/548 |
| 2,705,447 | 4/1955 | Robbins | 172/550 |
| 3,137,350 | 6/1964 | Horr | 172/117 |
| 3,499,495 | 3/1970 | Pust | 172/536 |
| 3,543,704 | 12/1970 | Hansen et al. | 111/52 |
| 3,714,913 | 2/1973 | Gandrup | 172/547 X |
| 3,958,520 | 5/1976 | Cantone | 172/120 |

FOREIGN PATENTS OR APPLICATIONS

| | | | |
|---|---|---|---|
| 519,456 | 12/1955 | Canada | 111/85 |
| 1,356,084 | 2/1964 | France | 111/85 |
| 27,546 | 3/1910 | United Kingdom | 111/85 |
| 1,174,281 | 12/1969 | United Kingdom | 111/85 |

Primary Examiner—Edgar S. Burr
Assistant Examiner—James R. Feyrer

[57] ABSTRACT

A depth control and protective apparatus is disclosed as particularly useful in a tillage assembly for sod seeding purposes. The apparatus includes a pair of skids mounted upon a pivoted arm, which arm has also mounted thereon a pair of cutter wheels for cutting a furrow in ground to be seeded, each skid including a ground engaging portion to determine the maximum depth of furrow cut by the cutter wheel. Each skid is mounted for essentially vertical movement with respect to the associated arm and cutter wheel mounted thereon to thereby determine and control the depth of furrow cut by the associated cutter wheel. A substantially circular plate has an oval aperture in the central portion through which the axle and drive for the cutter wheel extends, and an inwardly directed cylindrical flange extends to the periphery of the circular plate to protect the axle and to provide for movement of the skid relative to the cutter wheel and axle. A seed boot is fastened to the skid rearwardly of the cutter wheel by an ear extending above ground level between the cylindrical flange of the skid and the seed tube at a point spaced from the lower end thereof. Thus, regardless of the selected depth of the furrow cut, the tube remains in the same position relative to the ground.

10 Claims, 3 Drawing Figures

DEPTH CONTROL AND PROTECTIVE APPARATUS FOR TILLAGE ASSEMBLY

FIELD OF THE INVENTION

This invention relates to a depth control and protective apparatus and, more particularly, relates to such apparatus as a part of a tillage assembly.

BACKGROUND OF THE INVENTION

The use of tillage apparatus is well known, and various types of apparatus have been developed that are useful for one or more tasks.

As such apparatus has been developed and utilized, it has become evident that such apparatus can be improved, particularly for the many different tasks to be accomplished. It has been discovered, for example, that conventional tillage apparatus, such as disc harrows, disc cultivators and rotating hoes, have not proved to be entirely suitable for preparing ground for seeding when legumes are to be grown in establish grass sod.

For growing legumes in an established grass sod, the ground surface is often uneven and rocky and may have grass swards of differing thicknesses thereon. To prepare such ground for seeding or grassland renovation, it is desirable that the number of trips an inplement must make over such ground be held to a minimum in order to accomplish such tasks as tilling, seeding, cultipacking and spraying of herbicides. Hence, an implement capable of performing all the necessary tasks in succession during a single pass over the ground was needed.

Such an implement would preferably be towed, since this allows the tillage apparatus to be disconnected from the tractor in order to release the tractor for other uses, and, where towed, the engine of the towing tractor was commonly used for power as shown, for example, by the patent to Kaller, U.S. Pat. No. 2,957,529.

Responding to this need, apparatus has heretofore been developed having a capability for opening a furrow, depositing seed in the furrow, packing the seed, and spraying chemicals on the planted area. Examples of such apparatus for carrying out some or all the various tasks can be found, for example, in U.S. Pat. Nos. 2,685,243; 2,734,439; 3,491,709; 3,566,813; 3,568,613; 3,604,515; 3,611,956; 3,673,970; 3,701,327; 3,749,035; and 3,866,552.

Cutting of the sward and sod mat and providing a furrow therein has, however, proved to be a continuing problem, at least in some instances, including problems of controlling the depth and/or width of the furrow, and the associated problem of positioning the seed tube for dependable depositing of seed in a furrow cut by an associated cutter wheel, as well as providing protection for the cutter wheel drive.

SUMMARY OF THE INVENTION

This invention provides an improved depth control protective device for a tillage apparatus that is suitable for adjusting the depth of the furrow to be cut by a cutting wheel, while maintaining the seed tube positioned for dependably depositing seed and at the same time providing protection for the cutter wheel drive.

It is therefore an object of this invention to provide am improved depth control and protective device for a tillage apparatus.

It is another object of this invention to provide an improved depth control and protective device for adjusting the depth of a furrow to be cut.

It is still another object of this invention to provide an improved depth control and protective device for maintaining a seed tube boot in the same position relative to the ground regardless of the adjustment of the depth of the furrow to be cut.

It is yet another object of this invention to provide an improved depth control and protective device for protecting the cutter wheel drive.

It is still another object of this invention to provide an improved depth control and protective device for providing a skid upon which a seed tube is mounted and in connection with which the depth of cut of an associated cutter wheel is determined.

It is yet another object of this invention to provide an improved depth control and protective device for providing a skid a portion of which surrounds the cutter wheel drive.

With these and other objects in view which will become apparent to one skilled in the art as the description proceeds, this invention resides in the novel construction, combination and arrangement of parts substantially as hereinafter described and more particularly defined by the appended claims, it being understood that changes in the precise embodiment of the herein disclosed invention are meant to be included as coming within the scope of the claims.

BRIEF DESCRIPTION OF THE DRAWINGS

The accompanying drawings illustrate a complete embodiment of the invention according to the best mode so far devised for the practical application of the principles thereof, in which.

DESCRIPTION OF THE INVENTION

Figure 1:
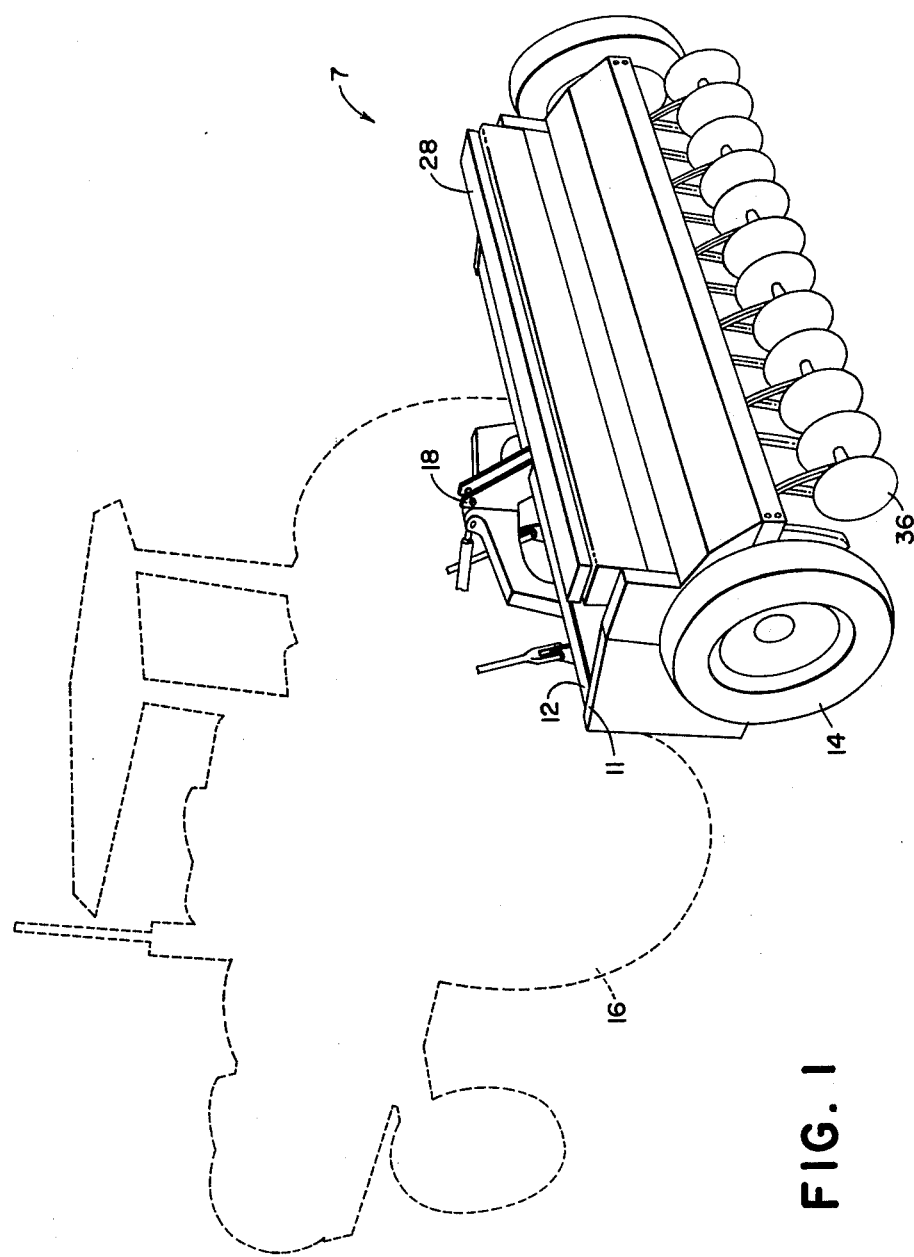
FIG. 1 is a perspective view of the tillage apparatus of this invention with the improved depth control and protective device of this invention mounted thereon.

Referring now to the drawings, FIG. 1 shows a tillage apparatus 7 that includes the improved depth control and protective device 9 of this invention. As shown apparatus 7 conventionally includes a tool bar or frame means 11 with one or more elongated members 12. Cross braces are preferably provided in suitable locations where a plurality of elongated members are utilized. Gauge wheels 14 mounted on the frame may also be provided. A tractor 16 is provided to tow the apparatus (though, alternately, it could be self propelled, if desired) and power from the tractor is conventionally coupled to the apparatus, as, for example, through shafts connected to universal joints between the power takeoff of the tractor and a gear box mounted on the apparatus. When towed, the apparatus is conventionally attached to the tractor as by a conventional three-point hitch 18 as indicated in FIG. 1.

As is also indicated, the frame means supports a plurality of pivoted arms 20 each of which is connected to one or more skids, each being indicated in its entirety by the reference numeral 22, of the depth control and protective device 9 of this invention. A pair of cutter wheels 24 are mounted on each arm 20 so as to be adjacent to skid 22, and a seed boot 26 is mounted on each skid adjacent to and rearwardly of each cutter wheel 24. Seed boots 26 are connected to a seed hopper 28 through tubing 30 and a conventional seed metering unit (not shown). As shown, packer wheels 36 are mounted rearwardly of skid 22 by means of bracket 38, so that the packer wheels preferably follow the furrow cut by the cutter wheels to pack seed therein. Each cutter wheel arm is preferably biased downwardly towards the skid in the ground contact during movement of the apparatus by the tractor (when towed).

The foregoing structure has been only briefly discussed herein to the extent deemed necessary to provide a structural setting to better explain the improvements of this invention. The overall combination of a cutter, seeding tube, and packer are shown, for example in U.S. Pat. Nos. 3,611,956; 3,749,035 and 3,866,552 and may be referred to for a more complete general description.

Figure 2:
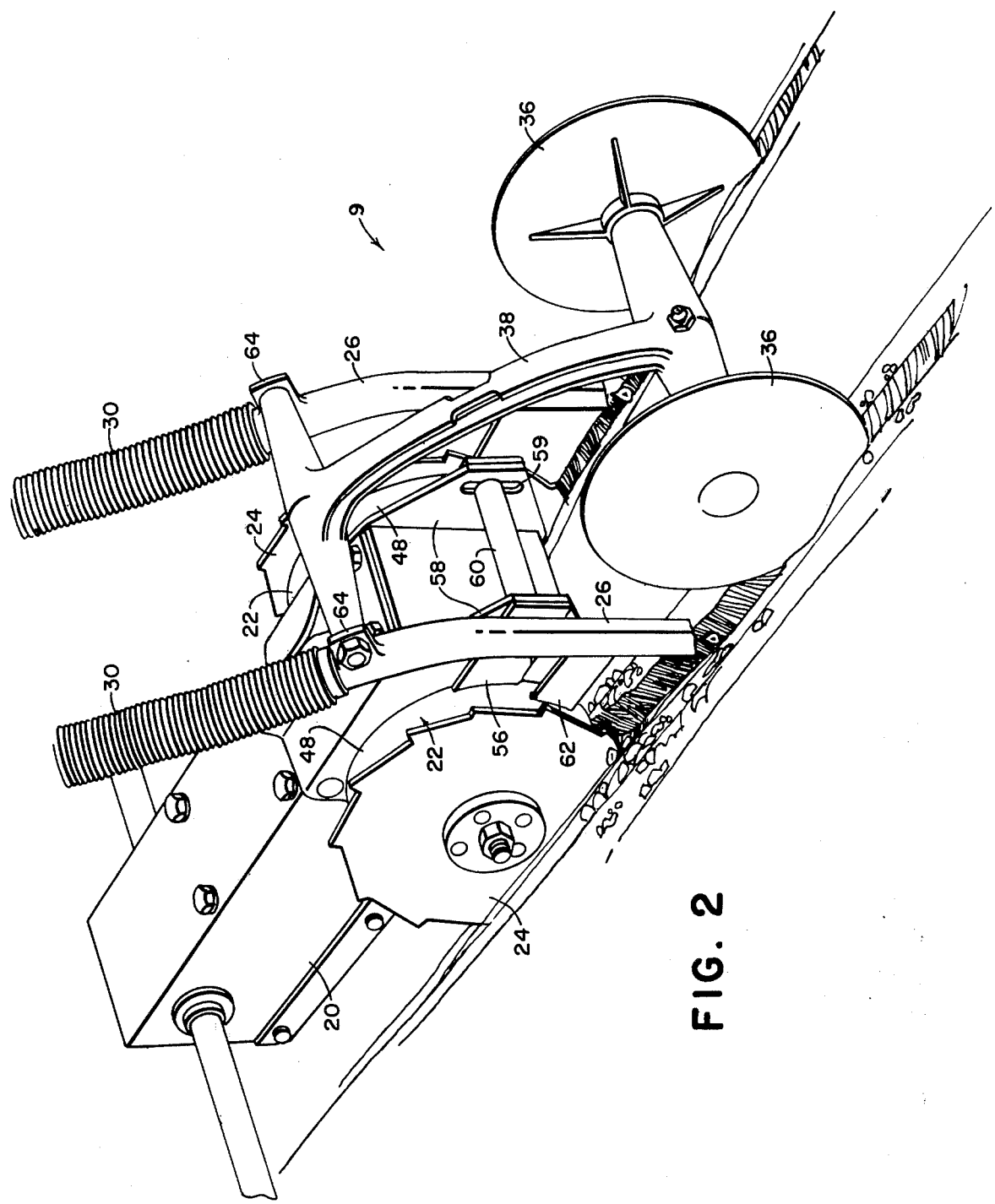
FIG. 2 is a perspective view of depth control skid including a pair of skids each having a cutting wheel and seed tube boot mounted thereon according to this invention.
Figure 3:
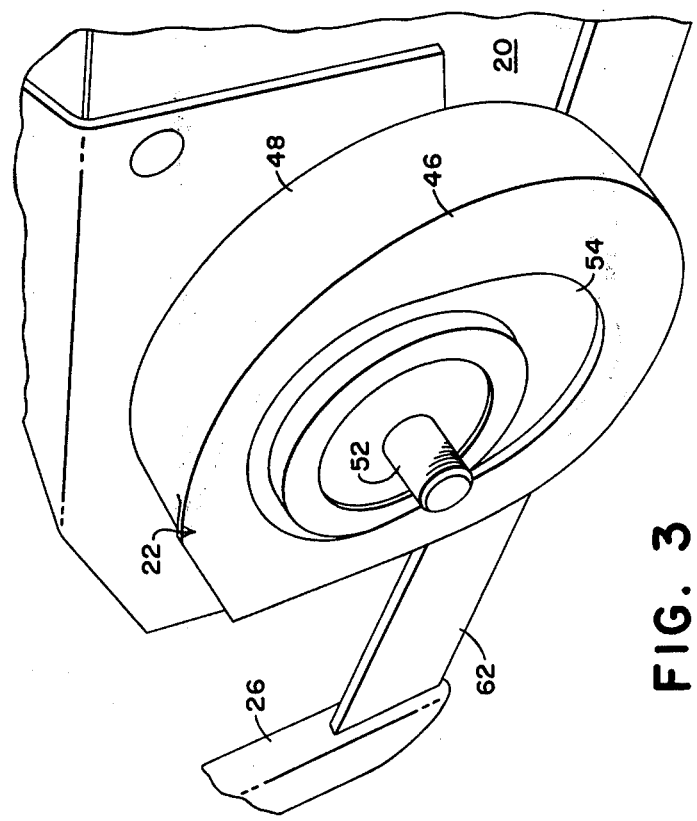
FIG. 3 is a perspective view of the depth control skid as shown in FIG. 2, but without the cutter wheel mounted thereon.

As shown best in FIGS. 2 and 3, the depth control and protective device 9 includes a pair of skids 22 each of which has a circular plate 46 with an inwardly extending cylindrical flange or band 48 extending from the periphery of plate 46. The lower or underside portion of flange 48 engages the ground when in normal operating position to determine or control the depth of cut of a furrow formed by the associated cutter wheel. The associated cutter wheel is mounted on a cutter wheel drive that includes a hub and axle 52 that extends through an oval aperture 54 in the circular plate 46 of the skid.

An ear (see FIG. 2) extends rearwardly from the back of flange 48, with ear 56 being mounted on flange 48 so that the ear is well above ground level. Tabs 58 extend rearwardly from the housing or arm 20 and each ear has a slot 59 therein mating with an aperture on ear 56. A bolt extends through the aperture in ear 56 and through slot 59 in tabs 58 and is conventionally secured by a nut (not shown) at the other side. A sleeve 60 extends between the tabs on the housing or arm 20. This permits the skid to be shifted in a vertical direction, with respect to arm 20 and the associated cutter wheel, to thereby change the depth of the furrow cut by the associated cutter wheel as desired.

In addition, a second ear 62 extends rearwardly from the rear portion of flange 48, again well above the ground. At the end of ear 62 is mounted seed tube boot 26 with the discharge end of the seed tube boot terminating near and rearwardly of the cutter wheel. As indicated, ear 62 is fastened to seed tube boot 26 above the lower end portion, and the lower end portion of the seed tube is in alignment with the furrow cut by the associated cutter wheel. The seed tube boot 26 has a tab 64 extending rearwardly therefrom for connection to other apparatus, as for example, packer wheels 36. The cutter wheels, seed tube boot and seed tube mounting assembly are preferably of steel, but the packer wheels may be of plastic, if desired.

In operation, the depth of a furrow to be cut is established by adjustment of ear 56 relative to tab 58. This causes the skid to assume the desired position relative to the associated cutter wheel. However, since the seed tube is fastened to the skid, the positioning of the seed tube boot with respect to the ground will remain the same regardless of the depth of cut selected for the associated cutter wheel. In addition, due to the structure of the plate and peripheral flange of the skid, the cutting wheel drive is protected against obstructions, such as roots and rocks, as well as avoiding a build up of foreign material such as vines, trash and the like.

As can be seen from the foregoing, this invention provides an improved depth control and protective device that is well suited for use as a part of a tillage assembly. Hence, the invention is not to be considered as being limited to the particular details given, not to the specific application to which reference has been made during the description of the apparatus, except insofar as may be required by the scope of the appended claims.

What is claimed is:

1. In a tillage unit having a cutter wheel mounted for rotation on a drive shaft on a pivotable arm of said tillage unit, a depth control and protective apparatus, comprising:
   a band adjacent to the cutter wheel on said arm of said tillage unit, the lower portion of said band being ground engageable to determine the depth of furrow to be cut by said cutter wheel during normal operation;
   seed tube means having a seed tube boot with a seed discharge portion;
   seed tube mounting means connected with said band so that said seed tube boot is protected against foreign matter during normal operation of said cutter wheel; and
   depth adjustment means for mounting said band to said arm of said tillage unit, whereby the depth of furrow to be cut by said cutter wheel may be adjusted.

2. The depth control and protective apparatus of claim 1, wherein said seed tube mounting means and said depth adjustment means are above ground level during normal operation of said tillage unit.

3. The depth control and protective apparatus of claim 1, wherein said depth adjustment means includes tab means on said arm and ear means on said band, said ear means being positionally adjustable relative to said tab means to control the depth of furrow cut by an associated cutter wheel.

4. The depth control and protective apparatus of claim 1, wherein said pivotable arm of said tillage unit has a pair of cutter wheels mounted thereon at opposite sides, and wherein said depth control and protective apparatus includes a pair of bands each of which is mounted adjacent a different one of said cutter wheels, with each said band having a seed tube mounted thereon, with depth adjustment means adjusting the depth of furrow of both said cutter wheels.

5. The depth control and protective apparatus of claim 4, wherein said tillage unit includes a plurality of pivotable arms each of which has said depth control and protective apparatus mounted thereon.

6. The depth control and protective apparatus of claim 1, wherein said band surrounds said drive shaft upon which said cutter wheel is mounted, with said band being between said arm and said cutter wheel.

7. The depth control and protective apparatus of claim 6, wherein said band has a circular plate attached thereto at the side adjacent to said cutter wheel, said circular plate having an aperture therein to permit adjustment of said band relative to said cutter wheel.

8. The depth control and protective apparatus of claim 7, wherein said circular plate has an oval aperture therein.

9. In a tillage unit having a pivotable arm with a pair of cutter wheels mounted on opposite sides thereof by means of a drive shaft, a depth control and protective apparatus, comprising:

a pair of depth-defining means each including a circular disc having a band connected to the periphery thereof, said disc having an oval shaped aperture therein with one of said depth-defining means being at one side of said arm adjacent one of said cutter wheels and the other of said depth-defining means being at the other side of said arm adjacent the other of said cutter wheels, said drive shaft passing through said apertures in said depth-defining means and the bottom portions of said bands being ground engagable;

seed tube means having a pair of seed tube boots each having a seed discharge portion;

a pair of seed tube mounting means each of which is connected with a different one of said depth-defining means and said seed tube boots to mount each of said seed tubes behind a different one of said cutter wheels; and depth-adjustment means for mounting both of said depth-defining means, said depth-adjustment means including a pair of mounting means each of which extends from a different one of said bands of said depth-defining means, a pair of spaced tabs extending from said pivotable arm and adjacent to said mounting means, and releasable fastening means connecting said tabs and mounting means to define the desired depth of furrow to be cut by said cutter wheels.

10. The depth control and protective apparatus of claim 9, wherein said seed tube mounting means and said depth-adjustment mounting means are connected to and extend rearwardly from said bands of said depth-defining means.

* * * * *

UNITED STATES PATENT OFFICE
CERTIFICATE OF CORRECTION

Patent No. 4,023,510                    Dated   17 May 1977

Inventor(s) Donald Thomas Sorlie, Henry William Brandt, Jr. and Thomas E. Hitzhusen It is certified that error appears in the above-identified patent and that said Letters Patent are hereby corrected as shown below:

Column 4, line 49, after "with" insert --said--; line 65 after "oval" insert --shaped--.

Signed and Sealed this

Sixth Day of December 1977

[SEAL]

Attest:

RUTH C. MASON
Attesting Officer

LUTRELLE F. PARKER
Acting Commissioner of Patents and Trademarks